United States Patent
Kiser, III (10) Patent No.: US 9,321,473 B2
(45) Date of Patent: Apr. 26, 2016

(54) CARRYING CART FOR SPECIAL NEEDS RIDER

(71) Applicant: Technibilt, Ltd., Newton, NC (US)

(72) Inventor: William E. Kiser, III, Lincolnton, NC (US)

(73) Assignee: Technibilt, Ltd, Newton, NC (US)

( * ) Notice: Subject to any disclaimer, the term of this patent is extended or adjusted under 35 U.S.C. 154(b) by 0 days.

(21) Appl. No.: 14/800,232

(22) Filed: Jul. 15, 2015

(65) Prior Publication Data

US 2016/0016600 A1    Jan. 21, 2016

Related U.S. Application Data

(60) Provisional application No. 62/025,635, filed on Jul. 17, 2014.

(51) Int. Cl.
  *B62B 3/06* (2006.01)
  *B62B 3/02* (2006.01)
  *B62B 3/00* (2006.01)

(52) U.S. Cl.
  CPC ... *B62B 3/02* (2013.01); *B62B 3/00* (2013.01); *B62B 3/001* (2013.01)

(58) Field of Classification Search
  CPC ............ B62B 3/02; B62B 3/001; B62B 3/14; B62B 3/1404; B62B 3/144; B62B 3/1444
  See application file for complete search history.

(56) References Cited

U.S. PATENT DOCUMENTS

| | | | |
|---|---|---|---|
| 5,015,037 A | 5/1991 | Giblin et al. | |
| 5,918,891 A * | 7/1999 | Russell | B62B 3/144 |
| | | | 280/33.991 |
| 5,961,133 A * | 10/1999 | Perry | B62B 3/144 |
| | | | 280/33.991 |
| 6,101,678 A | 8/2000 | Malloy et al. | |
| 6,186,521 B1 * | 2/2001 | Divoky | A47D 15/006 |
| | | | 280/33.992 |
| 6,237,924 B1 | 5/2001 | Reiland et al. | |
| 6,270,093 B1 | 8/2001 | Johnson et al. | |
| 7,350,788 B2 | 4/2008 | Booker | |
| 8,002,290 B2 | 8/2011 | Russell et al. | |
| D671,292 S * | 11/2012 | Long | D34/27 |
| D702,910 S * | 4/2014 | Long | D34/27 |
| 8,764,032 B1 * | 7/2014 | Dantice | B62B 5/0404 |
| | | | 280/47.35 |
| 2003/0160407 A1* | 8/2003 | Lantz | B62B 3/14 |
| | | | 280/33.991 |
| 2003/0205873 A1 | 11/2003 | Orozco | |
| 2004/0041457 A1* | 3/2004 | Coffman | B62B 3/144 |
| | | | 297/475 |
| 2004/0061297 A1* | 4/2004 | Booker | B62B 3/144 |
| | | | 280/33.993 |
| 2004/0090024 A1* | 5/2004 | Duchene | B62B 3/144 |
| | | | 280/33.993 |
| 2005/0151333 A1* | 7/2005 | Russell | B62B 3/144 |
| | | | 280/33.993 |
| 2007/0063461 A1* | 3/2007 | Peota | B62B 3/144 |
| | | | 280/33.992 |

(Continued)

*Primary Examiner* — Jeffrey J Restifo
*Assistant Examiner* — Erez Gurari
(74) *Attorney, Agent, or Firm* — The Van Winkle Law Firm; David M. Carter; William G. Heedy (57) ABSTRACT

There is provided a carrying cart suitable for carrying a rider. The cart includes a cargo basket, a plurality of wheels, and a frame. The cargo basket is mounted to the frame and the wheels are connected to the frame. A pair of handles are connected to the frame at the rear of the carrying cart. A rearward facing seat is located between the cargo basket and the pair of handles. Each handle includes a rotatable grip portion The grip portions are enabled to rotate to a substantially horizontal position and to a substantially vertical position. When the grip portions are in the substantially horizontal position the shopping cart is enabled to be pushed. When the grip portions are in the substantially vertical position, the rider is able to enter and exit the seat.

11 Claims, 8 Drawing Sheets

(56) References Cited

U.S. PATENT DOCUMENTS

| | | | |
|---|---|---|---|
| 2007/0063464 A1* | 3/2007 | Splain | B62B 3/12 280/33.992 |
| 2008/0018068 A1* | 1/2008 | Bartlett | B62B 3/1424 280/33.993 |
| 2008/0100010 A1* | 5/2008 | Russell | B62B 3/144 280/33.993 |
| 2008/0111328 A1* | 5/2008 | Ryan | B62B 3/144 280/33.993 |
| 2009/0236379 A1* | 9/2009 | Johnston | A45C 7/0077 224/155 |
| 2010/0276899 A1* | 11/2010 | Burdwood | B62B 3/1404 280/33.991 |
| 2011/0115177 A1* | 5/2011 | de Sousa | B62B 3/144 280/47.35 |
| 2011/0304110 A1* | 12/2011 | Long | A61G 5/00 280/33.992 |
| 2014/0232088 A1* | 8/2014 | Ektron | B62B 7/12 280/648 |
| 2015/0203139 A1* | 7/2015 | Ondrasik | B62B 3/144 280/33.993 |

* cited by examiner

FIG. 9

CARRYING CART FOR SPECIAL NEEDS RIDER

RELATED APPLICATIONS

This is a U.S. non-provisional application relating to and claiming the benefit of U.S. Provisional Patent Application Ser. No. 62/025,635 filed Jul. 17, 2014.

BACKGROUND

This invention relates to shopping carts. More particularly, it relates to shopping carts specifically designed for special needs riders.

U.S. Patent Publication No. US 2011/0304110 A1 which is incorporated herein by reference, describes a carrying cart accommodation for a special needs rider. The cart includes a rearward facing seat and a pair of push handles. The push handles rotate outwardly to permit the special needs rider to enter and exit the seat. As can be seen in FIG. 8 of U.S. Patent Publication No. US2011/0304110A1, when the handles are extended outwardly, those handles can interfere with the movement of other carts and shoppers who may be passing by the carrying cart. This can be a substantial problem in confined spaces such as narrow aisles.

EMBODIMENT OF THE INVENTION

In accordance with one form of this invention there is provided a carrying cart suitable for carrying a rider, preferably a special needs rider. The carrying cart includes a cargo basket, a frame, and a plurality of wheels. The cargo basket is mounted to the frame The wheels are connected to the frame. A pair of handles are connected to the frame at the rear of the shopping cart. A rearward facing seat is located between the cargo basket and the pair of handles. Each handle includes a handle sub-assembly having a rotatable grip portion. The grip portions are enabled to rotate to a substantially horizontal position and to a substantially vertical position. When the grip portions are in substantially horizontal position, the carrying cart is enabled to be pushed. When the grip portions are in the substantially vertical positions, the rider is able to exit and enter the seat.

In accordance with another form of this invention, there is provided a handle for a carrying cart having a frame. A hollow tube is provided having a rotatable grip portion and an extension. An approximately ninety degree (90°) bend is located between the rotatable grip portion and the extension. A cammed insert is fixedly received in the extension. The cammed insert has a hole there through. A projection is connected to the frame. The cammed insert has a ramp to interface with the projection. A spring and an elongated screw are provided. The elongated screw passes through the spring in the cammed insert. The projection makes contact with the ramp, riding up and down the ramp, thereby compressing and decompressing the spring as the grip portion is rotated so as to lightly secure the grip portion in its substantially vertical and substantially horizontal positions.

BRIEF DESCRIPTION OF THE DRAWINGS

For a fuller understanding of the nature of the present invention, reference should be made to the following detailed description, taken in conjunction with the accompanying drawings in which.

DESCRIPTION OF THE PREFERRED EMBODIMENT OF THE INVENTION

Figure 1:
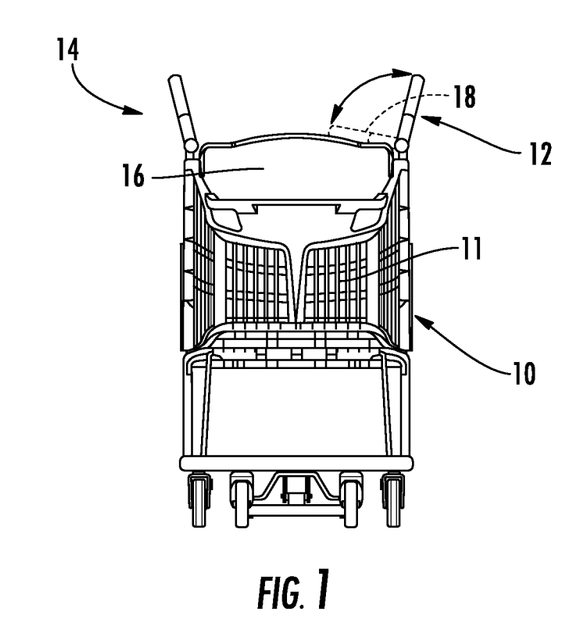
FIG. 1 is a front elevational view of a carrying cart of the present invention.
Figure 2:
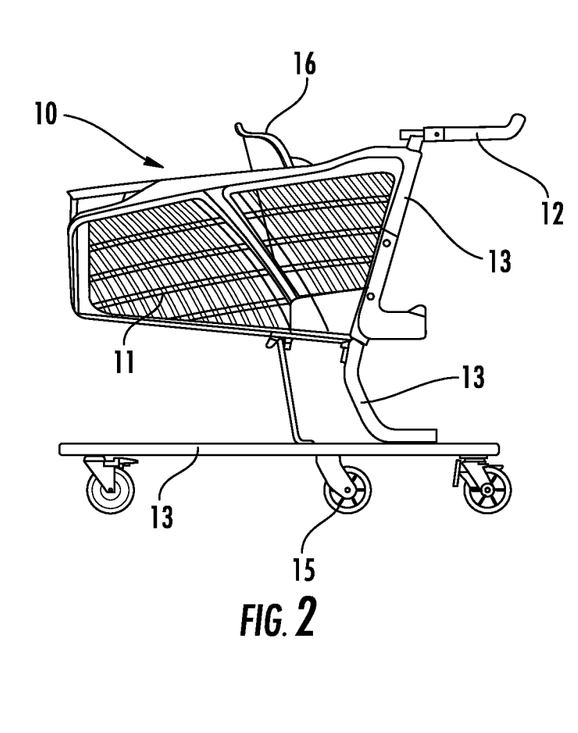
FIG. 2 is a side elevational view of the carrying cart of FIG. 1.
Figure 3:
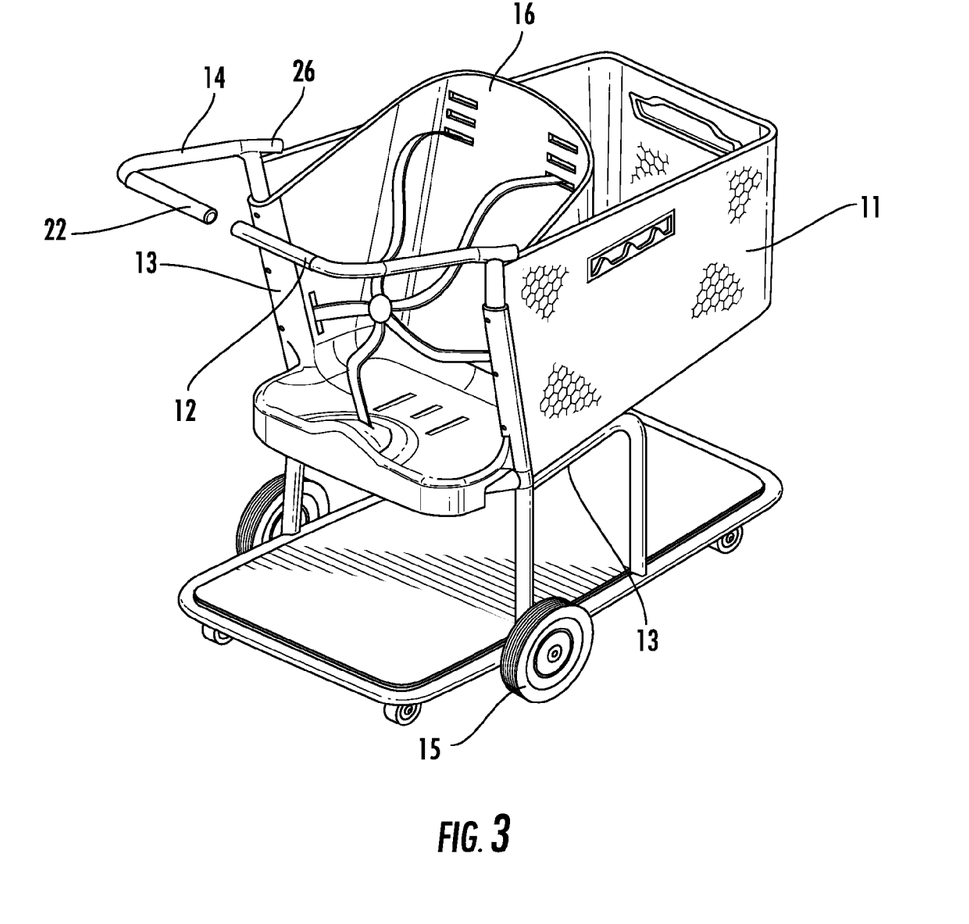
FIG. 3 is a rear side perspective view of a slightly different configuration of the carrying cart of FIG. 1 with the push handles in the down or substantially horizontal position.

There is provided a carrying cart 10 for a special needs rider. Cart 10 includes basket 11 and a pair of push handles 12 and 14 located at the rear of the carrying cart. Rearward facing seat 16, preferably specifically adapted for a special needs rider, is located between basket 11 and handles 12 and 14. Basket 11 is attached to frame 13 and handles 12 and 14 are also attached to frame 13. A plurality of wheels 15 are also attached to frame 13 The carrying cart 10 may be substantially identical to the carrying cart described in U.S. Patent Publication No. US2011/0304110A1, except for the construction of push handles 12 and 14 so the push handles 12 and 14 of the subject invention do not rotate outwardly to permit the rider to enter and exit the rearward facing seat 16. As can be seen in FIG. 1, Applicant's handles 12 and 14 extend upwardly or substantially vertically so that the rider can enter and exit the seat 16. After the rider has entered or exited the seat 16, the handles 12 and 14 are rotated into the downward or substantially horizontal handle position shown by phantom lines 18 of FIG. 1 and shown in FIGS. 2 and 3 so that the cart is ready to be pushed. By substantially vertically, it is meant plus or minus thirty degrees (30°) from vertical. By substantially horizontal, it is meant plus or minus twenty degrees (20°) from horizontal.

Figure 4:
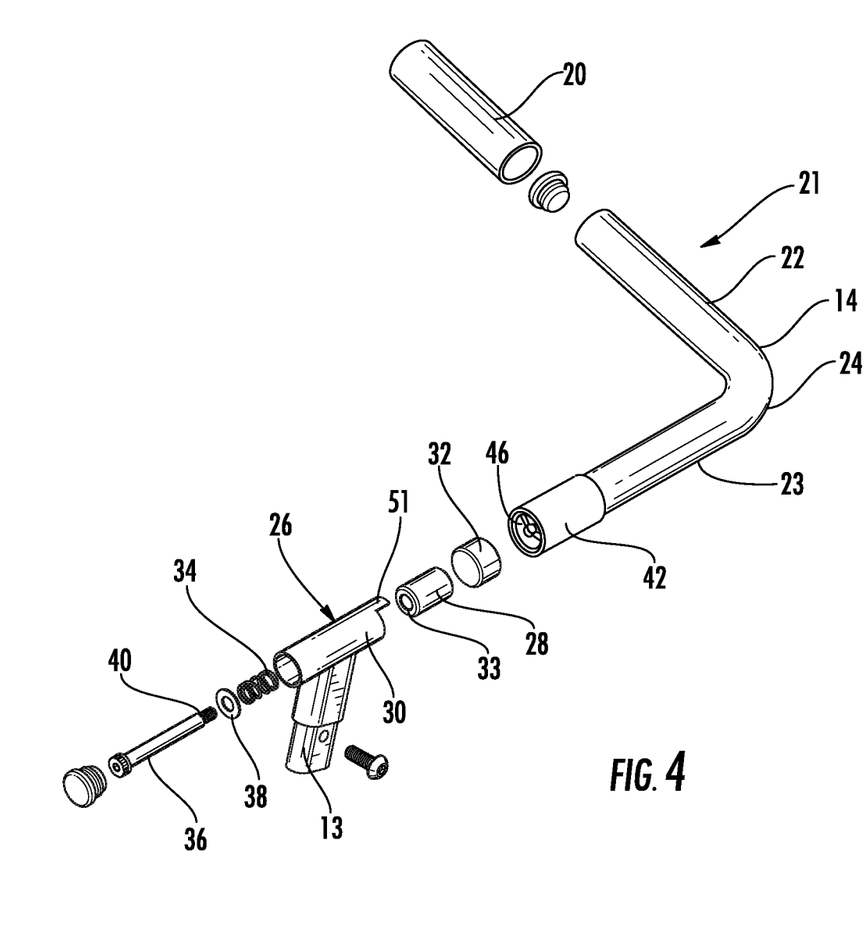
FIG. 4 an exploded view of one of the handles of the carrying cart of FIG. 1.
Figure 5:
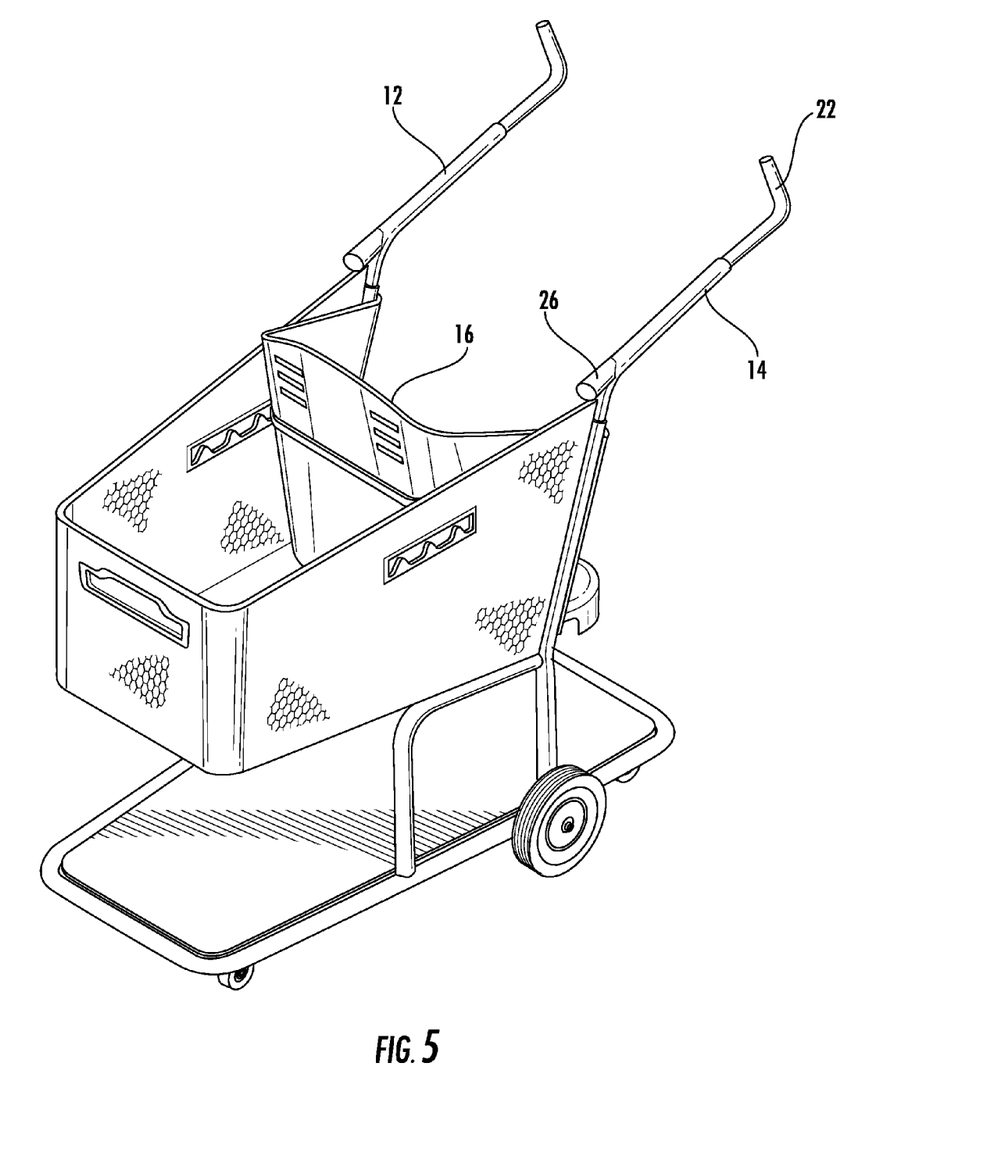
FIG. 5 is a front side perspective view of the carrying cart of FIG. 3 showing the handles in the up or substantially vertical position.
Figure 9:
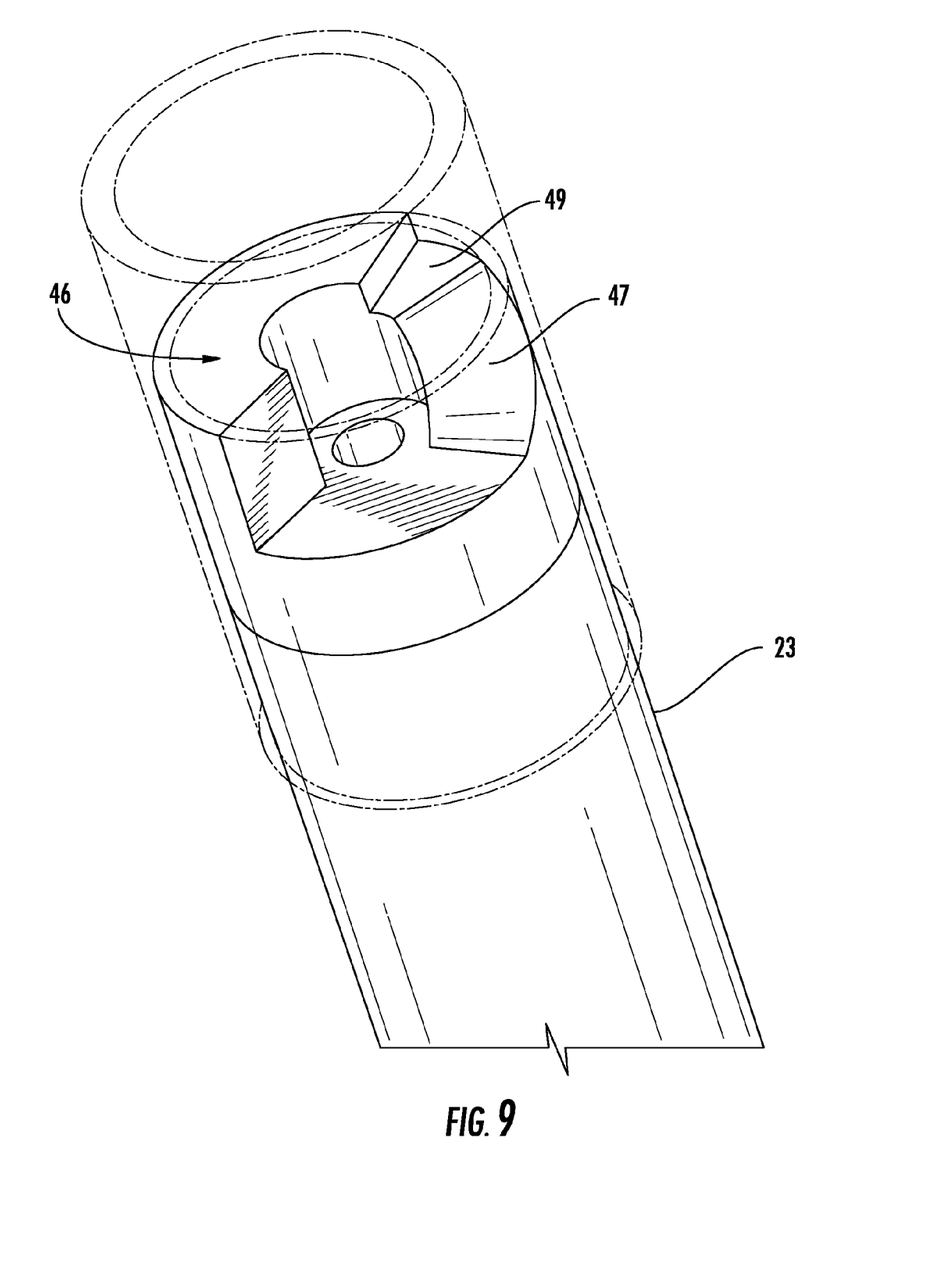
FIG. 9 is a partial perspective sectional view showing the camming insert within one of the handles.

FIG. 4 shows an exploded view of handle 14. Handle 12 is identical to handle 14. Handle 14 includes cushioned grip 20 which slides on to tubular handle sub-assembly 21. Handle sub-assembly includes rotatable grip portion 22 and extension 23 which is also rotatable. Handle 14 is curved and includes an approximately ninety degree (90°) bend 24 between grip portion 22 and extension 23. Handle upright assembly 26 is attached to the frame 13 of shopping cart 10. Inner bushing 28 is received within tubular portion 30 of handle upright assembly 26. Inner bushing 28 includes a hole there through. Outer bushing 32 is received over tubular portion 30. Spring 34 is received within tubular portion 30 and abuts against face 33 of inner bushing 28. Elongated shoulder screw 36 passes through spring 34, washer 38, tubular portion 30 and the hole in inner bushing 28. Shoulder screw 36 includes threads 40. Sleeve 42, which is attached to extension 23 houses a threaded nut 44 and cammed insert 46. Cammed insert 46 is fixed inside extension 23 as shown in FIG. 9. This may also be seen in reference to FIG. 6 which shows a cross-section of a portion of extension 23. The threaded portion 40 of shoulder screw 36 is connected to the threaded portion of nut 44. Shoulder screw 36 passes through cammed insert 46.

Figure 8:
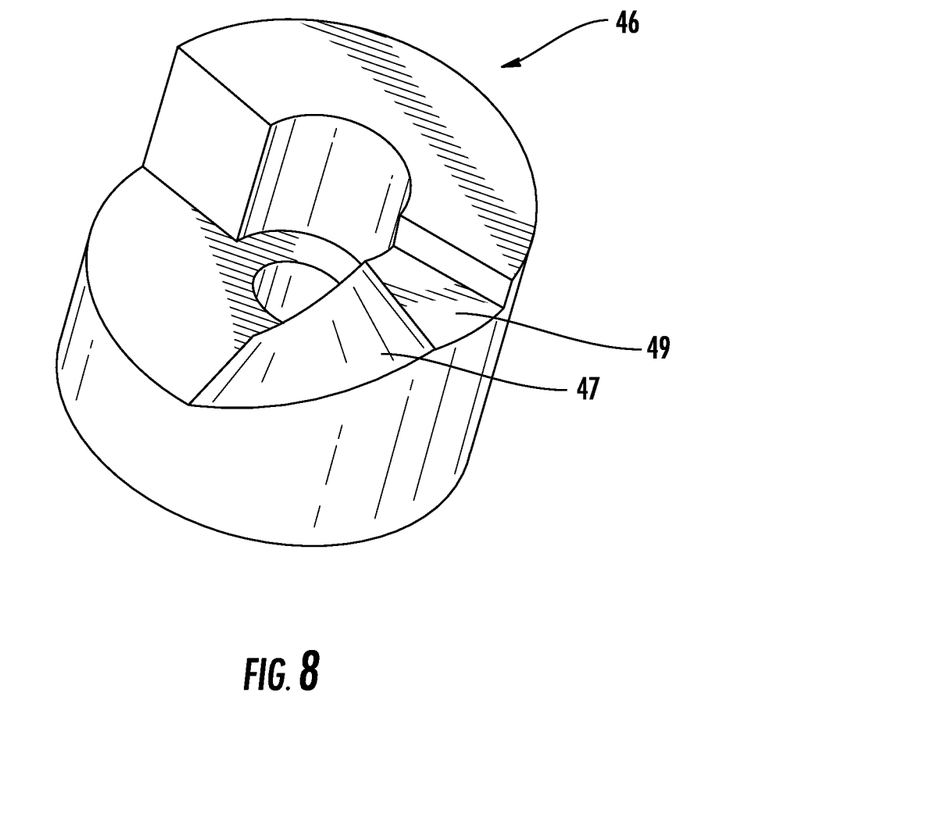
FIG. 8 is a top perspective view of the camming insert shown in FIG. 4.

The cammed insert 46 may be better seen in reference to FIGS. 8 and 9. Alternatively, threaded nut 44 could be eliminated and a threaded machine part could replace it. Also, the threaded nut could be eliminated by threading cammed insert 46.

In the down or substantially horizontal position, the handles 12 and 14 are preferably roughly ten degrees (10°) off horizontal and the internal spring 34 has a small pre-load or slight tension on it. This tension keeps the handles somewhat snug when the handles are in the substantially horizontal position hen the handles are in the substantially horizontal position, the cart is ready to be pushed.

Figure 6:
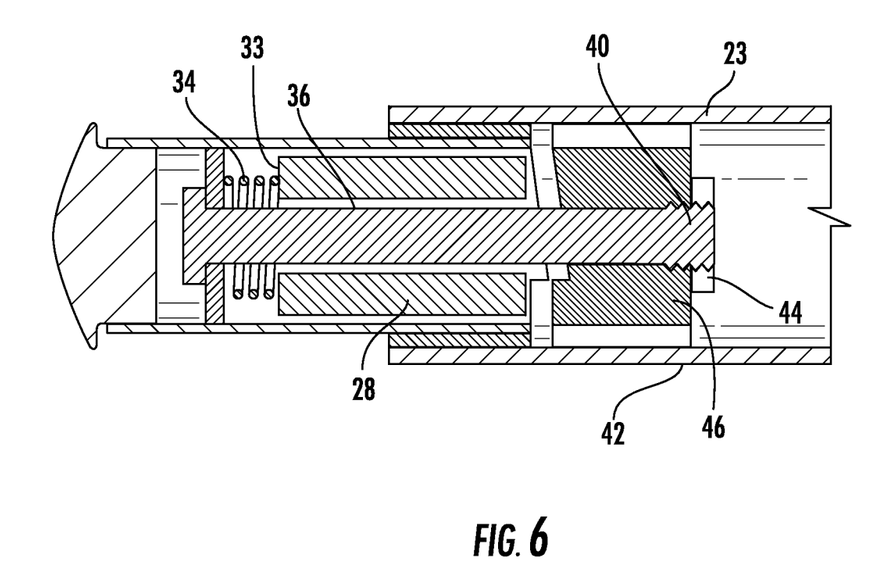
FIG. 6 is a sectional view showing a portion of one of the handles of the carrying cart of FIG. 1.

To load the occupant, the handles are rotated upwardly to the substantially vertical position. The rotation of the handle is a simple twist of the wrist. The internal components, in particular cammed insert 46, described above are designed with progressive slope 47 to give a smooth feel when rotating the handle. In the loading position, the handles are preferably roughly one hundred ten degrees (110°) off horizontal and the internal spring 34 is almost fully compressed as shown in FIG. 6. The cammed insert also has "shelf" 49 so that the handles can rest in the loading or substantially vertical position without falling back down. Once the loading of the occupant is completed, the handles are rotated back down to the substantially horizontal position and internal spring 34 becomes less compressed. One purpose of spring 34 is to assist the operator in returning the handles to the down position.

Figure 7:
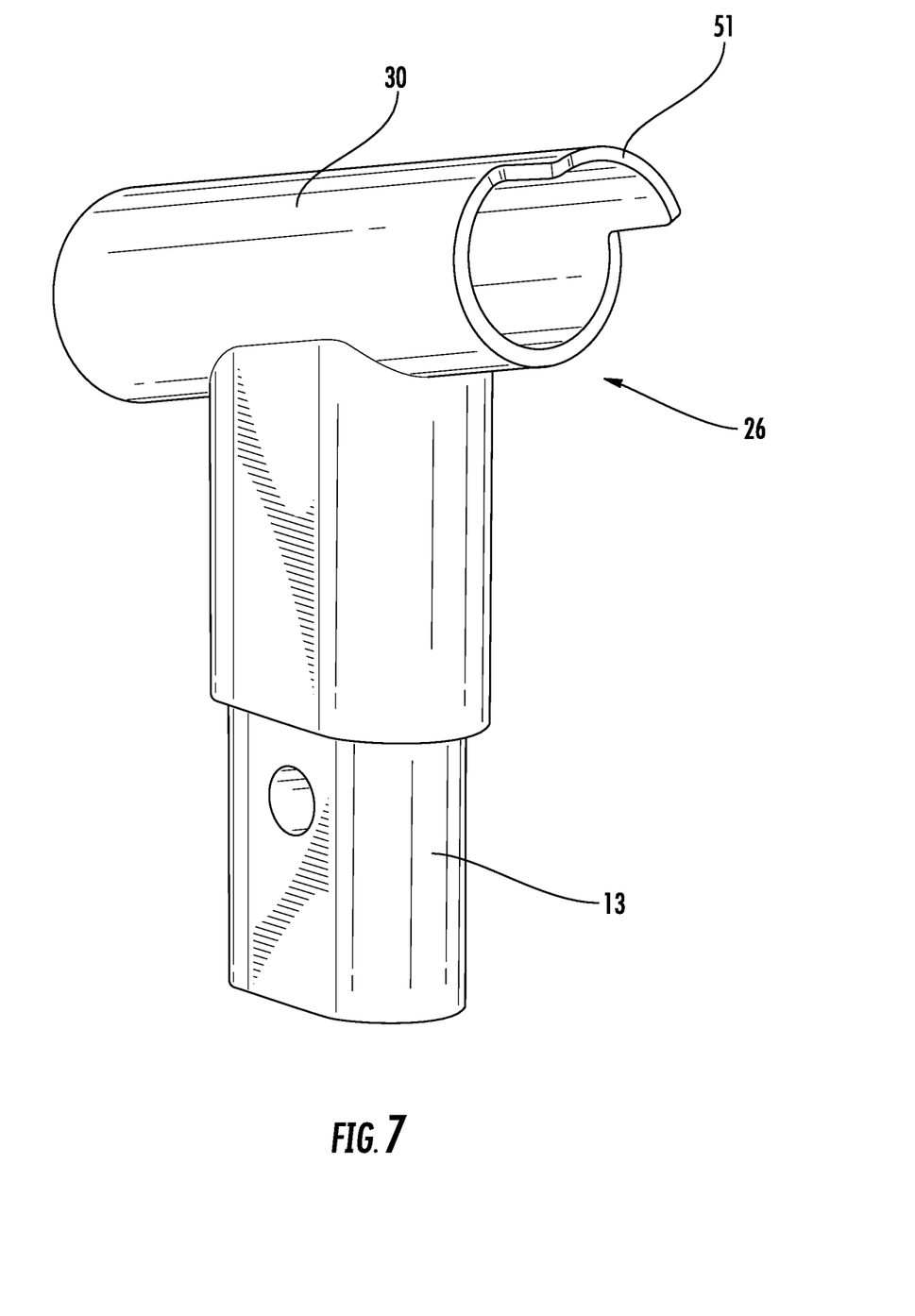
FIG. 7 is a perspective view of upright handle sub-assembly of FIG. 4 connected to the frame of the carrying cart.

As can be seen from FIGS. 4 and 7, tubular portion 30 of handle upright assembly 26 includes projection 51 which interfaces with camming insert 46. As handle 14 is rotated, projection 51 will move along progressive slope 47 of camming insert 46. When the handle 14 is in the substantially vertical position, projection 51 will rest on shelf area 49 of camming insert 46 to provide some resistance for the movement of the handle 14 out of the substantially vertical position so that loading the rider into seat 16 is easier and safer. As the grip portion 22 is rotated to the horizontal and vertical positions, the extension 23 will also rotate so that the cam 46 rotates with respect to extension 23.

Thus, the handles of the subject invention are not extended out into the aisle, which could block other carts as well as shoppers.

From the foregoing description of one embodiment of the invention, it will be apparent that many modifications may be made therein. It will be understood that this embodiment of the invention is an exemplification of the invention only and that the invention is not limited thereto.

The invention claimed is:

1. A carrying cart suitable for carrying a rider comprising:
    a cargo basket;
    a plurality of wheels;
    a frame; the cargo basket mounted to the frame; the wheels connected to the frame;
    a pair of handles connected to the frame at the rear of the shopping cart;
    a rearward facing seat located between the cargo basket and the pair of handles; and
    each handle including a rotatable grip portion; the rotatable grip portions are enabled to rotate to a substantially horizontal position and to a substantially vertical position; when the grip portions are in the substantially horizontal position, the shopping cart is enabled to be pushed; when the grip portions are in the substantially vertical positions, the rider is able to enter and exit the seat.

2. A carrying cart as set forth in claim wherein the rider is a special needs person.

3. A carrying cart as set forth in claim 1 wherein the handles include a mechanism for enabling the grip portions to rotate and for biasing the grip portions for stability.

4. A carrying cart as set forth in claim 3 wherein the handles include extensions; a substantially ninety degree bend in the handles between the grip portions and the extensions.

5. A carrying cart as set forth in claim 4 wherein a substantial portion of the handles are in the form of hollow tubes.

6. A carrying cart as set forth in claim 5 wherein the mechanism includes a spring, a cammed insert, and an elongated screw; the caromed insert having a hole there through; the elongated screw passing through the spring and the cammed insert; when the grip portions are in the substantially horizontal position, the spring is only slightly compressed to bias the grip portions towards the substantially horizontal position.

7. A carrying cart as set forth in claim 6 further including a handle upright sub-assembly connected to the frame: the handle upright assembly having a tubular portion; the tubular portion have a projection; the cammed insert having a ramp and a shelf; as the handle grip portions are rotated, the projection rides up and down the ramp thereby compressing and decompressing the spring; when the projection makes contact with the shelf, the grip portions are able to rest in the substantially vertical position; when the grip portions are in substantially vertical position, the spring is greatly compressed to assist the user to move the grip portions to their substantially horizontal positions.

8. A carrying cart as set forth in claim 6 wherein a portion of the mechanism is received in the extension.

9. A carrying cart as set forth in claim 8 wherein the cammed insert is fixed within the extension.

10. A carrying cart as set forth in claim 7, further including a post extending from he tubular portion of the handle upright sub-assembly for attachment to the frame.

11. A carrying cart as set forth in claim wherein the carrying cart is a shopping cart.

\* \* \* \* \*